United States Patent [19]

Goodell

[11] Patent Number: 4,827,623
[45] Date of Patent: May 9, 1989

[54] APPARATUS FOR DETERMINING THE ALIGNMENT OF VEHICLE WHEELS

[75] Inventor: Rick B. Goodell, Watertown, S. Dak.
[73] Assignee: Branick Industries, Inc., Fargo, N. Dak.
[21] Appl. No.: 947,633
[22] Filed: Dec. 20, 1986
[51] Int. Cl.$^4$ .............................................. G01B 11/26
[52] U.S. Cl. .................................... 33/288; 33/203.18
[58] Field of Search .................. 33/288; 356/155, 156, 356/152

[56] References Cited

U.S. PATENT DOCUMENTS

| | | | |
|---|---|---|---|
| 3,588,255 | 6/1971 | Alexander | 33/290 X |
| 4,097,157 | 6/1978 | Lill | 33/288 X |
| 4,311,386 | 1/1982 | Coetsier | 33/288 X |
| 4,432,145 | 2/1984 | Caroff | 33/288 |
| 4,466,196 | 8/1984 | Woodruff | 33/288 |

*Primary Examiner*—Harry N. Haroian
*Attorney, Agent, or Firm*—Merchant, Gould, Smith, Edell, Welter & Schmidt

[57] ABSTRACT

A laser enhanced alignment apparatus for wheeled vehicles includes first and second laser generator assemblies, each mounted to one of the vehicle front wheels, and first and second reflector assemblies similarly mounted to the rear wheels. Each laser generator assembly includes an elongate laser tube permanently mounted within a tubular housing with an annular silicone jacket over a substantial portion of the laser tube length. Each of the laser generator and reflector assemblies includes a support member which adjustably mounts its associated assembly to compensate for the toe of its associated wheel.

11 Claims, 3 Drawing Sheets

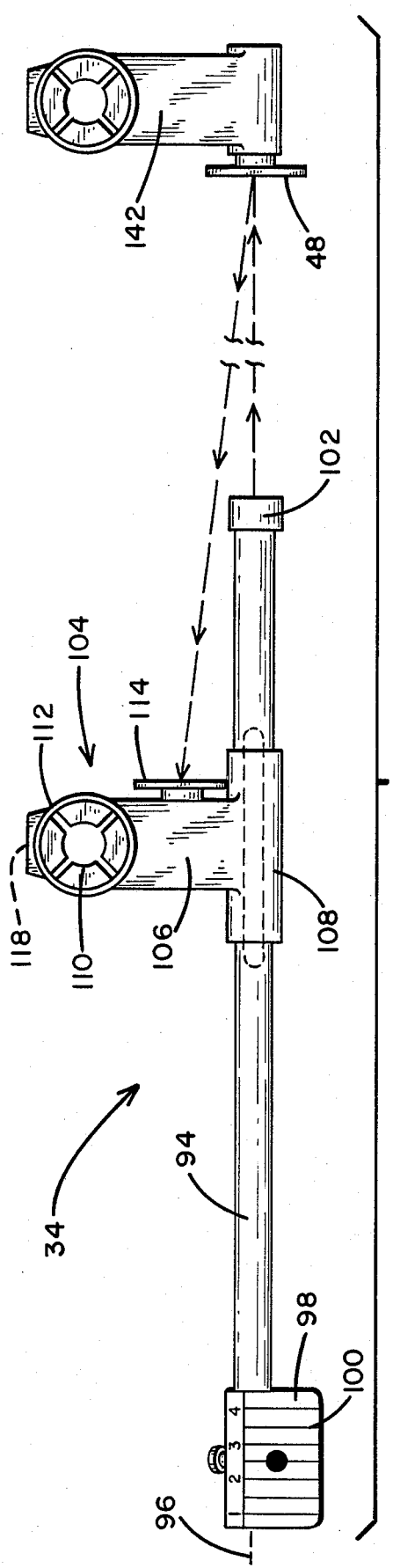
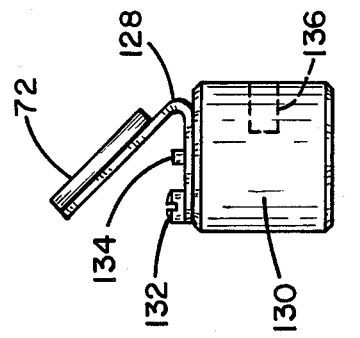
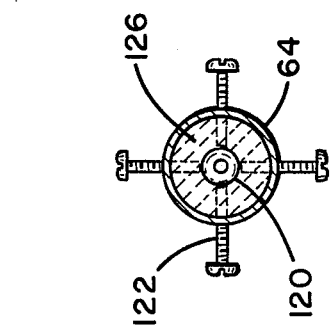
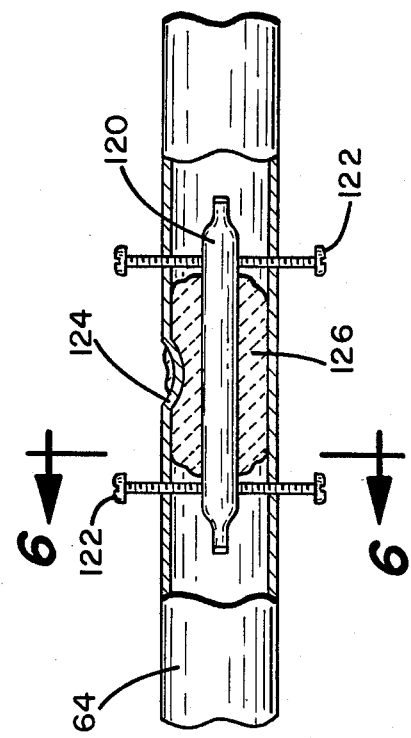
Fig. 4
Fig. 7
Fig. 6
Fig. 5

APPARATUS FOR DETERMINING THE ALIGNMENT OF VEHICLE WHEELS

BACKGROUND OF THE INVENTION

This invention relates to apparatus used in the course of aligning wheels of vehicles, and more particularly to laser enhanced equipment for determining the toe angle for vehicle wheels.

Systems for vehicle wheel alignment have been in use for years. A known optical system includes a light bulb housed near the center of an elongate, hollow tube, with lenses positioned near the ends of the tube to provide an optical beam directed outwardly from the tube in opposite directions. One such tube is mounted on each front wheel of the vehicle. A mirror is mounted to each of the vehicle rear wheels, for reflecting its associated beam back to a scale mounted on the tube. The forward portion of one of the optical beams is reflected transversely across the front of the vehicle, then reflected back to a second scale mounted on the tube, with both scales readable to determine the toe.

More recently, a laser has been employed in lieu of a conventional bulb. For example, U.S. Pat. No. 4,466,196 to Woodruff granted Aug. 21, 1984, shows a system including a laser module attached to the rear wheel of the vehicle, and a sensor module attached to the forward wheel. The sensor module includes an electromechanical pendulum for indicating its orientation. The laser module includes a housing, and a laser tube pivotally mounted within the housing. While such a system is satisfactory in certain respects, it is costly and complex as well.

Therefore, it is an object of the present invention to provide simple, low cost apparatus for determining wheel alignment parameters for vehicles.

Another object is to provide a process for manufacturing wheel alignment equipment at low cost.

Yet another object is to provide laser enhanced wheel alignment equipment including means for minimizing exposure of the laser energy generator to dust and other foreign matter, and to protect the generator from damage due to accidental jarring or the like.

SUMMARY OF THE INVENTION

To achieve these and other objects, there is provided an apparatus for determining wheel alignment parameters for wheeled vehicles. A first laser generator assembly includes a first elongate tubular housing with a first longitudinal axis. A first end cap is mounted to a rearward end of the first housing, and a first aperture is formed through the first end cap and substantially centered on the first longitudinal axis. An opening is formed transversely through the first housing proximate its forward end. A first elongate laser energy generator is permanently mounted inside the first housing, and emits a first laser beam with a forward beam portion forwardly of the generator, and a rearward beam portion rearwardly of the generator and passing through said first aperture as it exits the first housing. An inclined mirror is mounted in the first housing proximate the housing forward end, and is oriented to reflect the forward beam portion transversely through the opening. A forward scale means is mounted to the first housing near the inclined mirror and has forward scale indicia on its surface. A first rearward scale means is mounted to the first housing rearwardly of the forward scale means, and has first rearward scale indicia on its surface. A first forward support means adjustably mounts the first housing with respect to a first one of the forward wheels of the vehicle, orienting the first housing substantially horizontally and at a first predetermined angle with respect to the rotational axis of the first forward wheel.

Also provided is a first reflector assembly including a first reflecting means and a first rearward support means for adjustably mounting the first reflecting means to a first rear wheel of the vehicle, and positioned to reflect the rearward beam portion to said first rearward scale.

The apparatus further includes a second laser generator assembly including a second elongate tubular housing with a second longitudinal axis. A second end cap is mounted to a rearward end of the second housing, and a second aperture is formed through the second end cap substantially centered on the second longitudinal axis. A second elongate laser energy generator is permanently mounted in the second housing, and emits a second laser beam rearwardly of the second generator and exiting the second housing through the second aperture. A reflective plate is mounted near the forward end of the second housing, and is positioned to reflect the forward beam portion transversely to the forward scale means. A second rearward scale means is mounted to the second housing and has second rearward scale indicia on its surface. A second forward support means adjustably mounts the second housing with respect to a second forward wheel of the vehicle opposite the first forward wheel, to orient the second housing substantially horizontally and at a second predetermined angle with respect to the rotational axis of the second forward wheel.

Further, there is a second reflector assembly including a second reflecting means. A second rearward support means adjustably mounts the second reflecting means to a second rear wheel of the vehicle opposite the first rear wheel, and positions the reflecting means to reflect the second laser beam to said second rearward scale.

Preferably, each laser energy generator is an elongate laser tube, mounted generally coaxially within its associated tubular housing by a silicone rubber caulking material, which fills the annular volume between the laser tube exterior and housing over the majority of the laser tube length. The silicone provides a comparatively inexpensive means of permanently and accurately positioning the laser tube within the housing. Further, the silicone is capable of absorbing shock, to protect the laser tube in the event the housing is dropped or jarred.

Another aspect of the present invention is the process by which each laser tube is permanently mounted within its associated tubular housing, which includes the steps of:

(a) forming a plurality of internally threaded, radially directed alignment openings through the housing, with at least three first ones of the alignment openings arranged about the housing perimeter at a first location, and at least three second ones of said alignment openings arranged about the housing perimeter at a second location longitudinally spaced from said first location;

(b) threadedly engaging an alignment screw within each alignment opening;

(c) positioning said laser tube within said housing with its forward end portion opposite said first alignment openings, and with its rearward end portion opposite said second alignment openings, and selectively advancing the alignment screws until they engage the laser tube and support the tube in substantially coaxial relation to the housing;

(d) activating the laser tube to generate a laser beam, and adjusting the alignment screws to position the tube within said housing with the rearward portion of the laser beam passing through the aperture in the end cap;

(e) injecting a silicone rubber compound into the housing through an injection opening through the housing and between the first and second locations; and (f) allowing the silicone compound to cure and solidify, and removing the alignment screws after curing.

When curing is complete, the laser tube is permanently secured by the silicone compound alone, and the alignment screws may be removed.

Preferably, the end cap is provided with an aperture having a diameter slightly larger than the diameter of the laser beam. Then, not only is the aperture sized to facilitate alignment of the laser tube; it further minimizes entry of dust or other foreign matter into the housing to increase effectiveness and longevity of the laser tube. Moreover, should the laser tube somehow become dislodged from its proper alignment within the tubular housing, the aft portion of the laser beam is prevented from leaving the housing due to the end cap, thus warning the operator of the need for re-alignment.

IN THE DRAWINGS

For a better understanding of these and other features and advantages, reference is made to the following detailed description along with the drawings, in which:

FIG. 4 is a side elevation of the right laser generating assembly;

FIG. 5 is a side sectional view taken along a longitudinal vertical center plane through a medial portion of the left laser generating assembly;

FIG. 6 is a sectional view taken along the line 6—6 in FIG. 5;

FIG. 7 is an elevational view of an inclined mirror mounted at the forward end of the left laser generating assembly;

DETAILED DESCRIPTION OF THE PREFERRED EMBODIMENT

Figure 1:
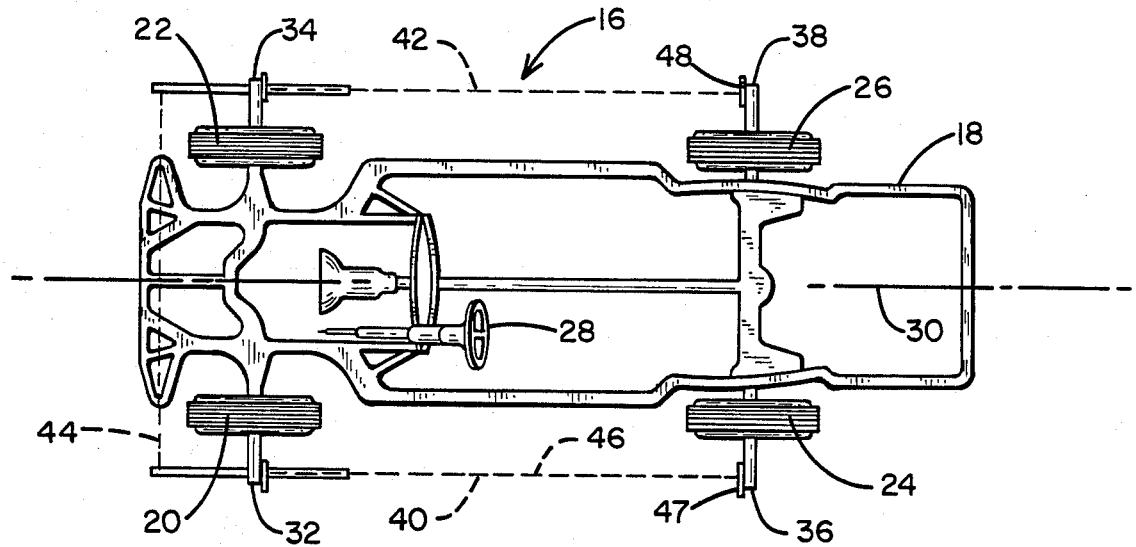
FIG. 1 is a schematic top plan view of a vehicle, with laser generating assemblies and reflector assemblies constructed in accordance with the present invention, mounted to the vehicle wheels.

Turning now to the drawings there is shown in FIG. 1 a vehicle 16, in this case an ordinary passenger car. The top of the vehicle is removed to reveal a rigid frame 18, and four wheels rotatably mounted with respect to the frame: a left front wheel 20, a right front wheel 22, a left rear wheel 24, and a right rear wheel 26. A steering wheel 28 of the vehicle controls the steering angle of front wheels 20 and 22, through a linkage not illustrated. A center line 30 runs longitudinally through vehicle 16.

Typically, front wheels 20 and 22 are designed to have an inward toe. That is, the rotational axis of front wheel 20 is not exactly perpendicular to center line 30, but is slightly inclined, giving wheel 20 a tendency to travel inward, toward the center line, as vehicle 16 moves forwardly. Right front wheel 22 has an opposite tendency, thus to provide the driver with better control over the vehicle. An inward toe is almost always provided in front wheels such as 20 and 22, and sometimes is provided in the rear wheels as well. The manufacturer specifications for a given automobile provide the desired toe settings, either in fractions of a degree, or in offset (fractions of an inch). During ordinary vehicle use, the actual toe tends to drift from the desired setting. Therefore it is necessary to periodically check actual toe of the vehicle, and to adjust the toe if necessary.

For this purpose, there is shown a wheel alignment system including a first laser generator assembly 32 mounted to left front wheel 20, a second laser generator assembly 34 mounted to right forward wheel 22, a first reflector assembly 36 supported on left rear wheel 24, and a second reflector assembly 38 mounted on wheel 26. First and second laser beams 40 and 42 are generated at the first and second laser assemblies, respectively. Further, first laser beam 40 has two portions: a forward beam portion 44 which is directed transversely across the forward end of the vehicle to the opposite side, and a rearward portion 46 directed rearwardly toward a rear mirror 47 of reflector assembly 36. Second laser beam 42 is directed only rearwardly, toward a rear mirror 48 of reflector assembly 38.

Figure 2:
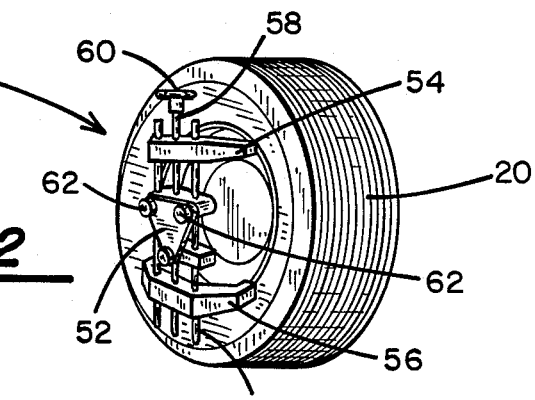
FIG. 2 is a perspective view of a clamp for mounting each of the assemblies to its associated wheel.

The utility of laser assemblies 32 and 34, and reflector assemblies 36 and 38, arises in part from the fact that each can be positioned in a selected orientation with respect to the rotation axis of its associated wheel. In some cases, an assembly is mounted directly to the axle of its associated wheel. Alternatively, as is shown in FIG. 2 for first front wheel 20, a rim clamp 50 supporting an adaptor plate 52 is mounted to the wheel. The clamp includes two generally C-shaped clamping members 54 and 56 supported on parallel rods 58. A handle 60 on one of the rods is rotatable to adjust the distance between clamping members 54 and 56. Three spaced apart adjustment knobs 62 are used to position adaptor plate 52 in an orientation which compensates for wheel run-out in a known manner. Clamps for the remaining wheels are substantially identical to clamp 50.

Figure 3:
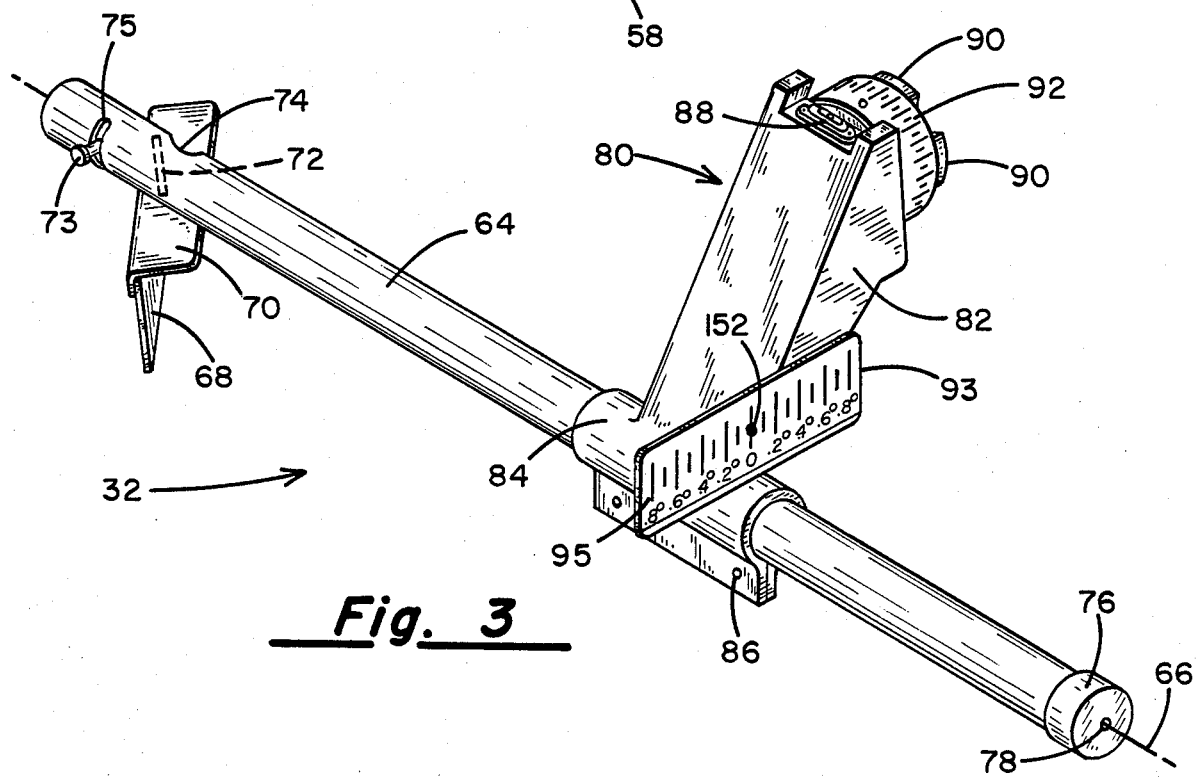
FIG. 3 is a perspective view of the left laser generating assembly, removed from the left forward wheel.

FIG. 3 shows first laser assembly 32 removed from forward wheel 20. The laser assembly includes an elongate tubular housing 64 having a longitudinal axis 66. Near the forward end of housing 64 is a forward screen 68, fixed with respect to the housing through a bracket 70. An inclined mirror, shown in broken lines at 72, is positioned inside the housing, inclined at an angle of 45° with respect to longitudinal axis 66. So inclined, mirror 72 reflects forward beam portion 44 outwardly of housing 64 through a forward opening 74, transversely of the tubular housing and, with a limited range of adjustment, substantially in the horizontal direction. More particularly, mirror 72 is rotationally adjustable with respect to tubular housing 64 by virtue of an adjustment knob 73 connected with respect to the mirror through a slot 75 formed near the forward end of the housing.

At the rearward end of tubular housing 64 is an end cap 76 which, like the housing, preferably is constructed of a metal such as aluminum. An aperture 78, preferably of a size not significantly larger than the laser beam cross-section (e.g. 1/64" diameter), is formed through end cap 76 at a point coincident with the longitudinal axis.

Generally near the center of the tubular housing is a laser housing support member 80 which adjustably mounts the housing with respect to left front wheel 20. The housing support member includes a heavy, rigid metal casting with a body portion 82 and a clamping portion 84 which surrounds housing 64 and is secured by screws 86, to prevent housing 64 from sliding or rotating with respect to housing support member 80.

At the top of body portion 82 is a level 88 used to aid the positioning of housing support 80 such that housing 64 has a horizontal orientation. The housing support member is removably fixed to adaptor plate 52 by a plurality of tapered magnets, two of which are shown at 90. Surrounding magnets 90 is a dial 92, rotatable to adjust the angular position of the body portion and of housing 64, to compensate for the manufacturer-specified toe angle of wheel 20. More particularly, dial 20 is adjusted to position tubular housing 64, horizontally and at a predetermined angle relative to the axis of rotation for wheel 20. The toe of the wheel is thus compensated, in the sense that if wheel 20 is set at its proper toe, longitudinal axis 66 is parallel to center line 30 of the vehicle. Further details of the operation of dial 92 are not disclosed, as they are known in the art and not particularly germane to the present invention. Set screws mount a rearward screen 93 in fixed relation to body portion 82. Provided on the planar, rearwardly facing surface of screen 93 are uniformly spaced apart indicia as indicated at 95.

As seen from FIG. 4, second laser assembly 34 is quite similar in construction to first laser assembly 32, and includes an elongate tubular housing 94 with a longitudinal axis 96. Near the forward end of housing 94 is a reflective plate 98 with a planar reflective surface oriented vertically and parallel to longitudinal axis 96. As indicated at 100, equally spaced apart indicia are provided on the surface of plate 98, used to show a setback of the left or right front wheel.

At the rearward end of tubular housing 94 is an end cap 102, substantially identical to end cap 76 in that a small diameter aperture is formed through it, coincident with longitudinal axis 96.

A laser housing support member 104, substantially similar to support member 80, adjustably mounts tubular housing 94 with respect to right front wheel 22. The support member includes a body portion 106 and a clamping portion 108 surrounding tubular housing 94 and secured by screws to prevent the housing from moving relative to the support member. A plurality of magnets 110 are adjustable by rotation of a dial 112, to set the angular position of body portion 106 with respect to wheel 22, to compensate for the toe angle in the same manner as first laser assembly 32 is positionally adjusted.

Mounted to housing support member 104 is a rearward screen 114, similar to screen 93 mounted to support member 80 in that it has a substantially planar, vertical and rearwardly facing surface on which is provided uniformly spaced apart indicia for use in determining toe readings. A level 118 is provided at the top of body portion 106 for positioning tubular housing 94 in its horizontal position.

FIGS. 5 and 6 illustrate the manner in which a laser generator tube 120 is positioned coaxially within tubular housing 64. It is imperative that the coaxial relation be maintained, and it also is desirable to protect laser tube 120 against undue shock, for example from dropping or jarring tubular housing 64. To these ends, a plurality of threaded alignment openings are formed through housing 64: four such openings arranged angularly about the housing perimeter, and four similarly arranged openings spaced apart longitudinally of the first four. An alignment cap screw 122 is threaded into housing 64 through each alignment opening. Then, with laser tube 120 in the housing, the alignment screws opposite each end of the tube are selectively tightened to align laser tube 120 concentrically with housing 64 as shown in FIG. 6. Such alignment is accomplished with the laser tube energized, so that it may be confirmed by the presence of first laser beam portion 44 emerging from the housing through aperture 78.

With laser tube 120 properly aligned, a clear silicone rubber caulking material is injected into tubular housing 64 through an injection opening 124 formed in the housing. One such material, sold by Dow Corning Company under the name RTV Sealant 732, has been found satisfactory. When injected, the caulking material is sufficiently maleable to flow about and surround laser tube 120 along its medial region between the forward and rearward alignment screws, curing to form a solid but elastically deformable jacket 126 between laser tube 120 and housing 64. Following curing, alignment screws 122 are removed and the alignment openings filled.

Jacket 126 is elastically deformable, and thus absorbs shock to protect laser tube 120 whenever tubular housing 64 is subjected to impact. At the same time, the elastic memory of jacket 126 is such that it restores laser tube 120 to its coaxial position in the housing almost immediately after any disturbance. The laser tube in housing 94 is similarly mounted.

FIG. 7 illustrates mirror 72 and its mounting structure removed from tubular housing 64. The mirror is fixed to a stand 128, bent to incline mirror 72 at the required 45° angle. Stand 128 is fixed to a cylindrical block 130 by a machine screw 132. A central axis of the block is aligned with longitudinal axis 66, thus to provide for rotation of block 130 within housing 64. Internally threaded openings are formed in block 130 for machine screw 132, an alignment screw 134 to center stand 130, and at 136, for receiving adjustment knob 73. The adjustment knob is inserted into opening 136 through slot 95, with the block in place in the tubular housing. Consequently, as adjustment knob 93 is moved within slot 95 relative to the housing, mounting block 130 rotates relative to the housing. Thus, the transversely directed portion of first beam 40 can be directed horizontally, or selectively angularly offset from a horizontal orientation by use of the adjustment knob.

Figure 8:
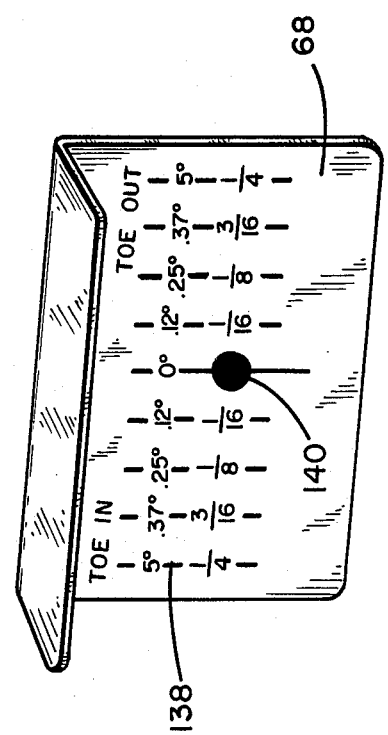
FIG. 8 is an elevational view of a forward toe scale of the left laser generator assembly.

FIG. 8 shows indicia 138 provided on forward screen 68 of tubular housing 64. With the laser assemblies and reflector assemblies mounted and adjusted to compensate for vehicle toe, the transverse portion of first laser beam 40, having been reflected back from plate 98, is positioned in the center of the screen as indicated at 140. Indicia 138 are arranged symmetrically in opposite directions from the screen center, to indicate toe in, and toe out, respectively.

Figure 9:
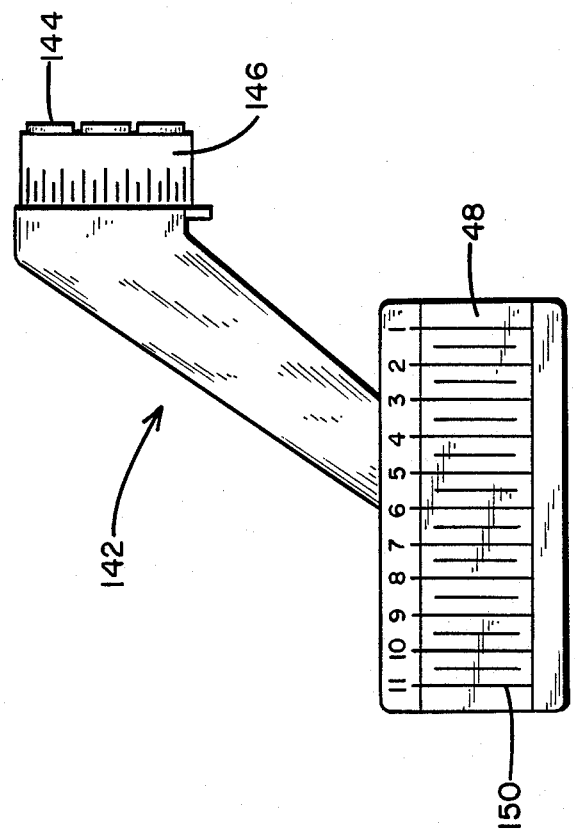
FIG. 9 is a rear elevation of the left reflector assembly.

FIG. 9 shows a reflector support member 142, similar in construction to laser housing support members 80 and 104. A plurality of magnets 144, adjustable by a rotatable dial 146, determine the orientation of support member 142 with respect to right rear wheel 26 in the manner described in connection with support member 80 and left front wheel. Rear mirror 48 is fixed to support member 142. Mirror 48 has a planar reflective surface oriented vertically and transversely of vehicle centerline 30, and is positioned, when mounted, to reflect beam 42 forwardly to screen 114. Mounted to the top of support member 142 is a level (not shown) similar to level 88, for ensuring a correct orientation for mirror 48. A series of graduated, vertical non-reflective markings 150 are provided across the face of mirror 48.

While not illustrated, a substantially similar reflector support member mounts rear mirror 47 with respect to left rear wheel 24. A graduated scale is provided on the left rear mirror as well, with numbers increasing away from the vehicle, or from left to right in a view equivalent to FIG. 9.

Figure 11:
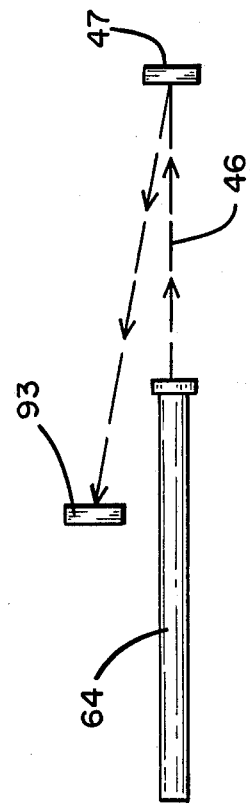
FIG. 11 is a schematic view showing a laser beam along the left side of the vehicle.
Figure 10:
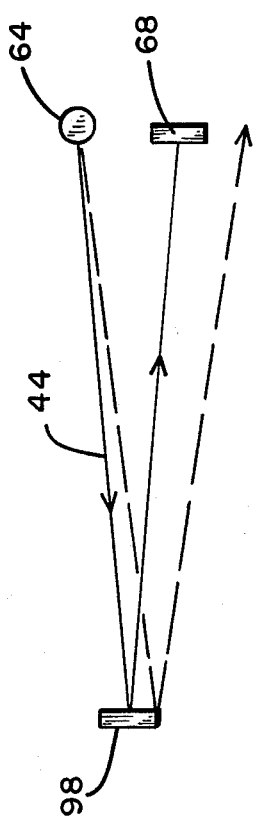
FIG. 10 is a schematic view showing a laser beam across the forward end of the vehicle.

FIGS. 10 and 11 are schematic views useful in understanding how the laser assemblies and reflector assemblies are utilized to determine wheel alignment. First, with steering wheel 28 properly centered, each of the laser assemblies and reflector assemblies is mounted to its associated wheel, either directly to the wheel axle or to its associated adaptor plate 52. The levels on the laser housing support members and reflector support members are used to horizontally position tubular housings 64 and 94, and to vertically align the reflective faces of rear mirrors 48 and 47. Then, the dial of each support member is rotationally set at the manufacturer-specified toe reading for its associated wheel.

At this stage, laser tube 120 is energized, whereupon forward beam portion 44 exits tubular housing 64 through opening 74, directed transversely to plate 98 whereupon it is reflected transversely back to screen 68 as shown by the solid line in FIG. 10. Occasionally, due to a camber in left front wheel 20, forward beam portion 44 may miss screen 68, or even plate 98. In this event, adjustment knob 73 is moved within slot 75 to properly orient the beam.

If beam portion 44 strikes the center of screen 68 as indicated in FIG. 8, the actual toe of front wheels 20 and 22 is correct. A positioning of beam 44 either to the left or right requires an adjustment of the appropriate tie rod or tie rod adjusting sleeve, until the laser beam is aligned with the zero marker.

To further ensure the accuracy of the toe settings, rear mirrors 48 and 47 can be employed to verify proper centering of the steering wheel. For this test, rearward beam portion 46 is utilized, as is second laser beam 42. The path of beam portion 46 is illustrated in FIG. 11, traveling rearwardly out of housing 64 through aperture 78 to mirror 47, whereupon it is reflected forwardly to rearward screen 93. The position of the reflector support member, determined with its associated level, may be adjusted if necessary to properly position the beam upon the rear screen. With the reflector support members properly positioned, a reading is taken along the graduated scale of each rear mirror. If the readings on both rear screens are identical, then steering wheel 28 is properly centered. However, if different readings are obtained, for example a reading of "7" on mirror 47 and a reading of "5" on mirror 48, both tie rods or both tie rod adjusting sleeves are adjusted the same amount in order to equalize the readings. Following such adjustment, forward screen 68 is reexamined to confirm that the reading remains at zero, indicating proper toe of wheels 20 and 22.

For checking the toe of rear wheels 24 and 26, the reflector support members, each with its associated dial adjusted to compensate for manufacturer-specified rear wheel toe, are moved out of level, if necessary, to reflect the associated laser beams upon rearward screens 93 and 114, respectively. Considering first laser beam 40, if the beam is centered on rearward screen 93 as indicated at 152 in FIG. 3, then left rear wheel 24 is at the proper toe setting. A similar reading is taken of second beam 42 upon rearward screen 114, to verify the toe of the right rear wheel 26.

One feature of the invention resides in the fact that each of mirrors 47, 48, 72 and 98 is of the front reflective surface type. The laser beams are reflected without passing through glass, and thus are not weakened or distorted, resulting in a more accurate laser beam that retains its brightness.

Another feature of the invention resides in the use of laser beams in connection with non-reflective, vertical markers on the reflective surfaces of mirrors 47, 48 and 98. In each case, a laser beam centered on one of the markers as it encounters the mirror surface, has a vertical portion of the beam absorbed rather than reflected. In effect, the reflected beam "carries" a vertical line corresponding to the beam portion not reflected, a line which becomes visible on the associated one of screens 68, 93 and 114, in order to facilitate a more accurate toe reading.

The silicone jacket surrounding the laser tube, in each of housings 64 and 94, ensures the proper alignment of each laser tube within its associated housing, and also protects each laser tube from the shock of any sudden impact upon the associated housing. The aperture in each end cap is sufficiently small to ensure accurate alignment of the associated laser tube prior to its permanent mounting. Given its small size, the aperture increases the useful life of the laser tube within the housing, as it substantially prevents entry of foreign matter into the housing.

What is claimed is:

1. An apparatus for determining wheel alignment parameters for wheeled vehicles, including:
a first laser generator assembly including an elongate first tubular housing with a longitudinal axis; a first end cap mounted to a rearward end of said first housing, and means forming a first aperture through said end cap and substantially centered on said first longitudinal axis; means forming an opening transversely through said first housing proximate the forward end thereof; a first elongate laser energy generator, permanently mounted in said first housing, and emitting a first laser beam with a forward beam portion forwardly of said generator, and a rearward beam portion rearwardly of said generator and exiting said first housing through said first aperture; an inclined mirror mounted in said housing proximate said forward end and oriented for reflecting the forward beam portion transversely of said first housing and through said opening; a forward scale means mounted to said first housing near said inclined mirror and having linear and parallel forward scale indicia thereon; a first rearward scale means mounted to said first housing rearwardly of said forward scale means, and having first linear and parallel rearward scale indicia thereon; and a first support means for adjustably mounting said first housing with respect to a first forward wheel of a vehicle, to orient said first housing substantially horizontally and at a first predetermined angle with respect to the rotational axis of said first forward wheel;

a first reflector assembly including a first front reflective surface reflecting means, and a first rearward support means for adjustably mounting said first reflecting means to a first rear wheel of said vehicle, and positioned to reflect said rearward beam portion to said first rearward scale means;

a second laser generator assembly including an elongate second tubular housing with a second longitudinal axis; a second end cap mounted to a rearward end of said second housing, and means forming a second aperture through said second end cap and substantially centered on said second longitudinal axis; a second laser energy generator, permanently mounted in said second housing, and emitting a second laser beam rearwardly of said second generator and exiting said second housing through said second aperture; a front reflective surface reflective plate mounted proximate the forward end of said second housing and positioned to reflect said forward beam portion tranversely to said forward scale means; a second rearward scale means mounted to said second housing and having second linear and parallel rearward scale indicia thereon; and a second forward support means for adjustably mounting said second housing with respect to a second forward wheel of said vehicle opposite said first forward wheel, to orient said second housing substantially horizontally and at a second predetermined angle with respect to the rotational axis of said second forward wheel;

a second reflector assembly including a second front reflective surface reflecting means and a second rearward support means for adjustably mounting said second reflecting means to a second rear wheel of said vehicle opposite said first rear wheel, and for positioning said reflecting means to reflect said second laser beam to said second rearward scale; and substantially non-reflective linear and parallel spaced apart indicia on each of said reflective plate and said first and second reflecting means, each parallel to their associated indicia of said forward scale indicia, first rearward scale indicia and second rearward scale indicia, respectively.

2. The apparatus of claim 1 wherein:

each of said first and second laser energy generators comprises an elongate laser tube permanently mounted in its associated one of said first and second housings.

3. The apparatus of claim 2 including:

an elastically deformable silicone rubber jacket between each laser tube and its associated housing, for so mounting said tube in said housing.

4. The apparatus of claim 3 wherein:

said silicone rubber jacket is formed by injecting silicone rubber into said associated housing, between said laser tube and said housing, while means independent of said jacket support said tube with respect to said housing.

5. The apparatus of claim 1 further including:

a means for rotationally adjusting the position of said inclined mirror with respect to said first tubular housing, thereby to allow the positioning of said forward beam portion transversely in the horizontal direction, and alternatively at a selected angular offset with respect to the horizontal direction.

6. The apparatus of claim 1 wherein:

each of said first and second apertures has a diameter slightly larger than the diameter of its associated one of said first and second laser beams.

7. An apparatus for determining wheel alignment parameters for wheeled vehicles, including:

a first laser generator assembly including an elongate first tubular housing with a longitudinal axis; a first end cap mounted to a rearward end of said first housing, and means forming a first aperture through said end cap and substantially centered on said first longitudinal axis; means forming an opening transversely through said first housing proximate the forward end thereof; a first elongate laser energy generator, permanently mounted in said first housing, and emitting a first laser beam with a forward beam portion forwardly of said generator, and a rearward beam portion rearwardly of said generator and exiting said first housing through said first aperture; an inclined mirror mounted in said housing proximate said forward end and oriented for reflecting the forward beam portion transversely of said first housing and through said opening; a forward scale means mounted to said first housing near said inclined mirror and having forward scale indicia thereon; a first rearward scale means mounted to said first housing rearwardly of said forward scale means, and having first rearward scale indicia thereon; and a first support means for adjustably mounting said first housing with respect to a first forward wheel of a vehicle, to orient said first housing substantially horizontally and at a first predetermined angle with respect to the rotational axis of said first forward wheel;

a first reflector assembly including a first reflecting means, and a first rearward support means for adjustably mounting said first reflecting means to a first rear wheel of said vehicle, and positioned to reflect said rearward beam portion to said first rearward scale means;

a second laser generator assembly including an elongate second tubular housing with a second longitudinal axis; a second end cap mounted to a rearward end of said second housing, and means forming a second aperture through said second end cap and substantially centered on said second longitudinal axis; a second laser energy generator, permanently mounted in said second housing, and emitting a second laser beam rearwardly of said second generator and exiting said second housing through said second aperture; a reflective plate mounted proximate the forward end of said second housing and positioned to reflect said forward beam portion transversely to said forward scale means; a second rearward scale means mounted to said second housing and having second rearward scale indicia thereon; and a second forward support means for adjustably mounting said second housing with respect to a second forward wheel of said vehicle opposite said first forward wheel, to orient said second housing substantially horizontally and at a second predetermined angle with respect to the rotational axis of said second forward wheel;

a second reflector assembly including a second reflecting means and a second rearward support means for adjustably mounting said second reflecting means to a second rear wheel of said vehicle opposite said first rear wheel, and for positioning said reflecting means to reflect said second laser beam to said second rearward scale;

each of said first and second laser energy generators comprising an elongate laser tube permanently mounted in its associated one of said first and second housings;

each of said laser tubes being permanently mounted within its associated tubular housing by a process including the steps of:

(a) forming a plurality of internally threaded, radially directed first and second alignment openings through said associated housing, with at least three of said first alignment openings arranged about the perimeter of said associated housing at a first location, and at least three of said second alignment openings arranged about the perimeter of said associated housing at a second location spaced longitudinally from said first location;

(b) threadedly engaging an alignment screw within each alignment opening;

(c) positioning each said laser tube in said associated housing with its forward end portion opposite said first alignment openings and its rearward end portion opposite said second alignment openings, and selectively advancing said adjustment screws until they engage said laser tube and support said tube in substantially coaxial relation to said housing;

(d) activating each said laser tube to generate a laser beam, and adjusting said alignment screws to position said tube within said housing so that said laser beam passes through its associated one of said apertures;

(e) injecting a silicone rubber compound into said associated housing through an injection opening in said associated housing and between said first and second locations; and (f) permitting said silicone compound to cure and solidify, and removing said alignment screws following curing.

8. The apparatus of claim 7 wherein:

said process includes the further step of filling said alignment openings following removal of said alignment screws.

9. An apparatus for determining wheel alignment parameters for wheeled vehicles, including:

a laser generator assembly including an elongate tubular housing with a longitudinal axis; an end cap mounted to a rearward end of said first housing, and means forming an aperture through said end cap substantially centered on said longitudinal axis; an elongate laser energy generator, comprising a laser tube permanently mounted in said housing, and emitting a laser beam exiting said housing through said aperture;

said laser tube being permanently mounted within said tubular housing by a process including the steps of:

(a) forming a plurality of internally threaded, radially directed first and second alignment openings through said housing, with at least three of said first alignment openings arranged about the perimeter of said housing at a first location, and at least three of said second alignment openings arranged about the perimeter of said housing at a second location spaced longitudinally from said first location;

(b) threadedly engaging an alignment screw within each alignment opening;

(c) positioning said laser tube in said housing with a forward end portion thereof opposite said first alignment openings and a rearward end portion thereof opposite said second alignment openings, and selectively advancing said adjustments screws until they engage said laser tube and support said tube in substantially coaxial relation to said housing;

(d) activating each said laser tube to generate a laser beam, and adjusting said alignment screws to position said tube within said housing so that said laser beam passes through said aperture;

(e) injecting a silicone rubber compound into said housing through an injection opening in said housing and between said first and second locations; and (f) permitting said silicone compound to cure and solidify, and removing said alignment screws following curing.

10. The apparatus of claim 9 wherein:

said process includes the further step of filling said alignment openings following removal of said alignment screws.

11. An apparatus for determining wheel alignment parameters for wheeled vehicles including:

a first laser generator assembly including an elongate first tubular housing with a longitudinal axis; means forming an opening transversely through said first housing proximate the forward end thereof; a first elongate laser energy generator, permanently mounted in said first housing, and emitting a first laser beam with a forward beam portion forwardly of said generator; and inclined mirror mounted in said housing proximate said forward end and oriented for reflecting the forward beam portion transversely of said first housing and through said opening; a forward scale means mounted to said first housing near said inclined mirror and having linear and parallel forward scale indicia thereon; and a first support means for adjustably mounting said first housing with respect to a first forward wheel of vehicle, to orient said first housing substantially horizontally and at a first predetermined angle with respect to the rotational axis of said first forward wheel;

a second assembly including a front reflective surface reflective plate mounted on a second housing and positioned to reflect said forward beam portion transversely to said forward scale means; and means for adjustably mounting said second housing with respect to a second forward wheel of said vehicle opposite said first forward wheel; to orient said second housing substantially horizontally and at a second predetermined angle with respect to the rotational axis of said second forward wheel; and substantially non-reflective linear and parallel spaced apart indicia on said reflective plate, each parallel to their associated indicia of said forward scale indicia;

a means for rotationally adjusting the position of said inclined mirror with respect to said first tubular housing, thereby to allow the positioning of said forward beam portion transversely in the horizontal direction, and alternatively at a selected angular offset with respect to the horizontal direction;

a first end cap mounted to a rearward end of said first housing, and means forming a first aperture through said end cap and substantially centered on said first longitudinal axis; and a rearward beam portion rearwardly of said generator and exiting said first housing through said first aperture; a first rearward scale means mounted to said first housing rearwardly of said forward scale means, and having first linear and parallel rearward scale indicia thereon;

a first reflector assembly including a first front reflective surface reflecting means, and a first rearward support means for adjustably mounting said first reflecting means to a first rear wheel of said vehicle, and positioned to reflect said rearward beam portion to said first rearward scale means; and substantially non reflective linear and parallel spaced apart indicia and said first reflective means, each parallel to their associated indicia of said first rearward scale indicia;

said second assembly including a laser generator assembly comprising an elongate second tubular housing with a second longitudinal axis; a second end cap mounted to a rearward end of said second housing, and means forming a second aperture through said second end cap and substantially centered on said second longitudinal axis; a second laser energy generator, permanently mounted in said second housing, and emitting a second laser beam rearwardly of said second generator and exiting said second housing through said second aperture; said front reflective surface reflective plate mounted proximate the forward end of said second housing and positioned to reflect said forward beam portion transversely to said forward scale means; a second rearward scale means mounted to said second housing and having second linear and parallel rearward scale indicia thereon;

a second reflector assembly including a second front reflective surface reflecting means and a second rearward support means for adjustably mounting said second reflecting means to a second rear wheel of said vehicle opposite said first rear wheel, and for positioning said reflecting means to reflect said second laser beam to said second rearward scale; and substantially non-reflective linear and parallel spaced apart indicia on said second reflecting means, each parallel to there associated indicia of said second rearward scale indicia.

* * * * *

UNITED STATES PATENT AND TRADEMARK OFFICE
CERTIFICATE OF CORRECTION

PATENT NO. : 4,827,623

DATED : May 9, 1989

INVENTOR(S) : Rick B. Goodell

It is certified that error appears in the above-identified patent and that said Letters Patent is hereby corrected as shown below:

```
Column 5, line 22
  "dial 20" should be --dial 92--

Column 6, line 26
  "maleable" should be --malleable--

Column 12, line 9
  "adjustments" should be --adjustment--

Column 13, line 19
  "non reflective" should be --non-reflective--

Column 14, line 25
  "there" should be --their--
```

Signed and Sealed this

Fifteenth Day of May, 1990

*Attest:*

HARRY F. MANBECK, JR.

*Attesting Officer*   *Commissioner of Patents and Trademarks*